(12) United States Patent
Nie et al.

(10) Patent No.: US 10,807,030 B2
(45) Date of Patent: Oct. 20, 2020

(54) BLADE GROUP FOR DEMISTING AND DEDUSTING

(71) Applicant: JIANGSU LANSHAN ENVIRONMENT TECHNOLOGY CO., LTD., Nanjing, Jiangsu Province (CN)

(72) Inventors: Jiangning Nie, Nanjing (CN); Bin Ling, Nanjing (CN); Jiali Xu, Nanjing (CN)

(73) Assignee: JIANGSU LANSHAN ENVIRONMENT TECHNOLOGY CO., LTD., Nanjing, Jiangsu (CN)

( * ) Notice: Subject to any disclaimer, the term of this patent is extended or adjusted under 35 U.S.C. 154(b) by 249 days.

(21) Appl. No.: 16/060,915

(22) PCT Filed: Dec. 6, 2016

(86) PCT No.: PCT/CN2016/108698
§ 371 (c)(1),
(2) Date: Jun. 8, 2018

(87) PCT Pub. No.: WO2017/097183
PCT Pub. Date: Jun. 15, 2017

(65) Prior Publication Data
US 2018/0361288 A1  Dec. 20, 2018

(30) Foreign Application Priority Data
Dec. 8, 2015 (CN) .......................... 2015 1 0897108

(51) Int. Cl.
*B01D 45/00* (2006.01)
*B01D 45/06* (2006.01)
(Continued)

(52) U.S. Cl.
CPC ............ *B01D 45/06* (2013.01); *B01D 45/12* (2013.01); *B01D 45/16* (2013.01);
(Continued)

(58) Field of Classification Search
CPC .................... B01D 45/16; B01D 53/78; B01D 2258/0283; B01D 19/0057; B01D 45/12; B04C 3/06; B04C 2003/006
See application file for complete search history.

(56) References Cited

U.S. PATENT DOCUMENTS 1,735,298 A * 11/1929 Pfeffer ...................... B04C 3/04
55/343
1,809,375 A *  6/1931 Chase .................... F02M 29/06
48/189.2

(Continued)

*Primary Examiner* — Dung H Bui
(74) *Attorney, Agent, or Firm* — Proi Intellectual Property US; Klaus Michael Schmid

(57) ABSTRACT

The present invention provides a blade group for demisting and dedusting, comprising a plurality of blades that are annularly arranged and a support mechanism for fixing the blades; wherein the blade comprises a section of curved plate, a cross section of the curved plate being a gradually-varied arc curve whose curvature increases progressively along an airflow direction. When gas carrying fine mist droplets or fine dust particles are passing through the blade group for demisting and dedusting, since the gas is different from the mist droplets or dust particles in terms of mass, separation of the gas from the liquid or dust under the effect of inertia is promoted. Especially, the gradually-varied blade curve enables the droplets or dusts to be captured and removed efficiently under the effect of a constantly-varied inertia and a drag force, which remarkably improves the working efficiency in combination with a washing device.

3 Claims, 14 Drawing Sheets

(51) Int. Cl.
  *B01D 45/16* (2006.01)
  *B01D 45/12* (2006.01)
  *B01D 53/78* (2006.01)
  *B04C 3/00* (2006.01)
  *B01D 19/00* (2006.01)

(52) U.S. Cl.
  CPC .......... *B01D 19/0057* (2013.01); *B01D 53/78* (2013.01); *B01D 2258/0283* (2013.01); *B04C 2003/006* (2013.01)

(56) References Cited

U.S. PATENT DOCUMENTS

| | | | | |
|---|---|---|---|---|
| 2,201,301 | A * | 5/1940 | Richardson | B04C 3/04 55/397 |
| 2,662,610 | A * | 12/1953 | Heinrich | B04C 3/06 55/347 |
| 3,360,909 | A * | 1/1968 | Barnerias | B04C 5/081 55/348 |
| 3,421,296 | A * | 1/1969 | Beurer, Sr. | F02C 7/052 55/306 |
| 3,443,368 | A * | 5/1969 | Wilson | B04C 5/085 55/435 |
| 3,517,821 | A * | 6/1970 | Keller | B04C 3/06 210/512.1 |
| 3,543,485 | A * | 12/1970 | Hardison | B04C 3/00 55/398 |
| 3,825,212 | A * | 7/1974 | Darges | B64D 13/08 244/118.5 |
| 3,915,679 | A * | 10/1975 | Roach | B04C 3/04 55/347 |
| 4,008,059 | A * | 2/1977 | Monson | B01D 45/14 55/396 |
| 4,050,913 | A * | 9/1977 | Roach | B01D 50/002 96/381 |
| 4,162,906 | A * | 7/1979 | Sullivan | B04C 3/00 210/512.1 |
| 4,242,115 | A * | 12/1980 | Harold | B01D 45/16 55/347 |
| 4,289,611 | A * | 9/1981 | Brockmann | B04C 3/04 209/710 |
| 4,311,494 | A * | 1/1982 | Conner | B01D 45/16 55/394 |
| 4,420,314 | A * | 12/1983 | Barron, Jr. | B04C 5/06 55/436 |
| 4,537,608 | A * | 8/1985 | Koslow | B01D 50/002 55/337 |
| 4,629,481 | A * | 12/1986 | Echols | B01D 45/16 122/34 |
| 4,966,703 | A * | 10/1990 | Kalnins | B01D 17/0217 210/512.1 |
| 5,149,341 | A * | 9/1992 | Taylor | B01D 19/0057 118/603 |
| 5,320,652 | A * | 6/1994 | Akel | F22B 37/322 55/320 |
| 5,480,464 | A * | 1/1996 | De Villiers | B01D 39/1615 55/320 |
| 6,702,877 | B1 * | 3/2004 | Swanborn | B01D 45/16 95/269 |
| 6,884,273 | B2 * | 4/2005 | Kopec | B01D 45/12 210/512.2 |
| 7,279,020 | B2 * | 10/2007 | Christiansen | B04C 3/06 55/338 |
| 8,002,866 | B2 * | 8/2011 | Kondo | F22B 37/327 55/457 |
| 8,025,706 | B2 * | 9/2011 | Poorte | B01D 45/14 55/346 |
| 8,746,464 | B2 * | 6/2014 | Maier | B04C 11/00 210/512.1 |
| 9,192,886 | B2 * | 11/2015 | Nieuwoudt | B01D 45/12 |
| 9,234,484 | B2 * | 1/2016 | Lewington | F02M 35/10013 |
| 9,272,235 | B2 * | 3/2016 | Yamase | B01D 46/0004 |
| 9,782,701 | B2 * | 10/2017 | Ackermann | B01D 21/26 |
| 10,286,407 | B2 * | 5/2019 | Correia | B04C 3/00 |
| 10,427,172 | B2 * | 10/2019 | Altorf | B01D 45/08 |
| 2008/0110140 | A1 * | 5/2008 | Egger | B01D 45/16 55/337 |
| 2009/0205489 | A1 * | 8/2009 | Miemiec | B01D 46/0024 95/35 |
| 2010/0275561 | A1 * | 11/2010 | Lundquist | B04C 3/06 55/456 |
| 2012/0117928 | A1 * | 5/2012 | Kondo | B01D 45/14 55/442 |
| 2013/0152525 | A1 * | 6/2013 | Brandner | B04C 3/04 55/447 |
| 2015/0068169 | A1 * | 3/2015 | Schulz | B01D 45/12 55/337 |
| 2015/0273375 | A1 * | 10/2015 | Krishnamurthy | B04C 3/04 95/269 |
| 2018/0169553 | A1 * | 6/2018 | Billiet | B01D 45/16 |

\* cited by examiner

BLADE GROUP FOR DEMISTING AND DEDUSTING

TECHNICAL FIELD

The present invention pertains to the technical field of gas purification, and in particular, relates to a blade group for demisting and dedusting.

BACKGROUND

In the field of gas purification, such devices including a baffle demister, a screen gas-liquid separator, a swirl plate separator and a cyclone separator are commonly used in order to separate fine particles, for example, dusts, mist droplets and the like contained in the gas. In the wet flue-gas treatment process, for example, limestone-gypsum desulfurization, ammonia desulphurization and the like, the performance of a demister profoundly affects normal running of the entire system. Generally, due to low efficiency of the demister, it is common that the flue-gas particles discharged from the flue-gas treatment and gypsum rain around the chimney are caused. However, with the development of the society, in industrial application, higher requirements are imposed to the separator device, and the standards for removing the particles are improved to nano-scale from micron-scale.

SUMMARY

A technical objective of the present invention is to provide a blade group for demisting and dedusting to overcome or improve the defects in the prior art.

To achieve the above objective, the present invention provides the following technical solution:

A blade group for demisting and dedusting comprises a group of blades and a supporting member for fixing the blades, the group of blades being formed by a plurality of blades that are annularly arranged; wherein the blade comprises a section of curved plate, a cross section of the curved plate being a gradually-varied arc curve whose curvature increases progressively along an airflow direction.

Based on the above solution, the blade group for demisting and dedusting may be further designed to any one of the following four solutions:

Solution 1:

The supporting member comprises an outer frame and a central member, and the group of blades is provided with long blades and short blades; wherein an outer end of the long blade is connected to the outer frame and an inner end of the long blade is fixed to the central member; and the short blades are arranged between adjacent long blades, an outer end of the short blade is fixed to the outer frame and an inner end of the short blade is not connected to the central member and is distal from the central member. Since the blades at the center of the blade group for demisting and dedusting are compact in terms of structure and are subject to a great resistance relative to the outer edge, distribution of the gas flow is not uniform, and meanwhile pressure loss of the gas is increased. With the above structure, combination of the long blades and short blades, distribution of the resistance of the blade group may be adjusted.

A plurality of short blades having different lengths may be arranged between the adjacent long blades.

Solution 2:

The blade group comprises an upper blade layer and a lower blade layer are arranged; wherein an outer diameter of the upper blade layer is greater than that of the lower blade layer, blades of the upper blade layer are fixed to a cylindrical central ring, blades of the lower blade layer are fixed to a columnar central member, the central member and the central ring are coaxial, and an incident-flow face at the bottom of the central member is provided with a flow guide cone to reduce pressure loss. Preferably, a generant of the flow guide cone may be an arc curve whose circumferential curvature increases from the top to the bottom of the glow guide cone.

The upper blade layer extends at a gradually-bending end of the curved plate to form a section of straight plate, wherein the straight plate is connected to the curved plate by virtue of smooth transition.

Solution 3:

The supporting member comprises a central member, the blades are fixed to the central member, the central member is internally provided with a washing water distribution chamber, the central member is provided with a water injection port in communication with the washing water distribution chamber, a washing hole is arranged, corresponding to each blade, on a side wall of the washing water distribution chamber, and a washing water distribution wheel is mounted in the washing water distribution chamber; the washing water distribution wheel comprises a central seat and a plurality of arc baffles vertically arranged on a periphery of the central seat, wherein the arc baffle is configured to shield the washing hole, a water discharge gap is maintained between adjacent arc baffles, the central seat is connected to the arc baffle via an inclined ramp, an outer edge of the inclined ramp is connected to an inner side face of the arc baffle, an inner edge of the included ramp is connected to the central seat, and the inclined ramps connecting the arc baffles to the central seat are all clockwise inclined or all counterclockwise inclined; a central shaft rod is arranged in the washing water distribution chamber of the central member, and the central seat of the washing water distribution wheel is mounted on the central shaft rod and rotates around the shaft rod under effect of a water force; and the incident-flow face at the bottom of the central member is provided with the flow guide cone.

When the blade group for demisting and dedusting needs to be washed, water is injected into the water injection port of the central member, and the water flow is jet from the washing hole of the central member to wash the blades. Under shock of the water flow, the washing water distribution wheel rotates to intermittently shield or expose the washing hole on the side wall of the central member. In this way, the water pressure is improved, the washing effect is enhanced, and water is saved.

The blades extend at a gradually-bending end of the curved plate to form a section of straight plate, wherein the straight plate is connected to the curved plate by virtue of smooth transition.

For the convenience of mounting of the washing water distribution wheel, in this solution, the blade group for demisting and dedusting may be formed via interconnection of an upper portion and a lower portion. The central member is divided at the washing water distribution chamber into two an upper part and a lower part; wherein a ring of blades are fixed to the upper part of the central member, a ring of blades are also fixed to the lower part of the central member and are staggered with the blades at the upper part of the central member, such that the two rings of blades are spliced into one layer after the upper part and the lower part of the central member are engaged.

Solution 4:

The supporting member comprises a cylindrical central ring passing through in a vertical direction, the blades surround the central ring and are fixed to the central ring, and the central ring extends by a section at the side of incident-flow of the blade group relative to the position of a gas inlet port of the blades.

The blade group in this solution is suitable for treating the gas in a rotarily flowing state. In a demisting device, the blade group for demisting and dedusting may be used in series with the blade groups for demisting and dedusting as described in the above three solutions. One or a plurality of blade groups in this solution are arranged at the rear section of the blade groups in other solutions, and the gas flow flowing through the blade group for demisting and dedusting at the front section enters the rotarily flowing state, such that the gas flow is far away from the central position of a flow guide cylinder of the demisting device and flows to approach to the wall of the glow guide cylinder, and the blade group for demisting and dedusting at the rear section may further improve the separation efficiency. In addition, pass-through is achieved at the central position of the blade group for demisting and dedusting, and therefore, pressure loss of the gas flow may be reduced.

In the above solution 1 to solution 3, to reduce the pressure loss at the center of the blade group, the gas is guided to the blades, and a flow guide cone may be arranged at a lower end of the central member of the blade group, that is, an incident-flow end. The generant of the flow guide cone is an arc curve whose circumferential curvature increases from the top to the bottom of the glow guide cone.

In the above solution 1 to solution 4, an outer edge of each blade is provided with transversal arc mounting bar, and mounting bars of the blades on the same layer form a circular structure for fixing and holding. This enhances the mounting strength of the blades and facilitates welding.

Preferably, the arc curve is a corrected involute, and the curve equation is:

$$\begin{cases} x = k*r*(\cos\varphi + \varphi*\sin\varphi) \\ y = r*(\sin\varphi - \varphi*\cos\varphi) \\ k = 0.3 - 3 \end{cases}$$

wherein φ is a spread angle, r is a base circle radius, and k is a correction coefficient.

Beneficial Effects:

When gas carrying fine mist droplets or fine dust particles are passing through the blade group for demisting and dedusting, since the gas is different from the mist droplets or dust particles in terms of mass, separation of the gas from the liquid or dust under the effect of inertia is promoted. Especially, the gradually-varied arc curve enables the droplets or dusts to be captured and removed high efficiently by the gradually-varied blade curve surface of the blade under the effect of a constantly-varied inertia and a drag force, which remarkably improves the working efficiency in combination with a washing device.

DETAILED DESCRIPTION

For elaboration the technical solution and technical objective of the present invention, the present invention is further described hereinafter with reference to the accompanying drawings and specific embodiments.

Figure 25:
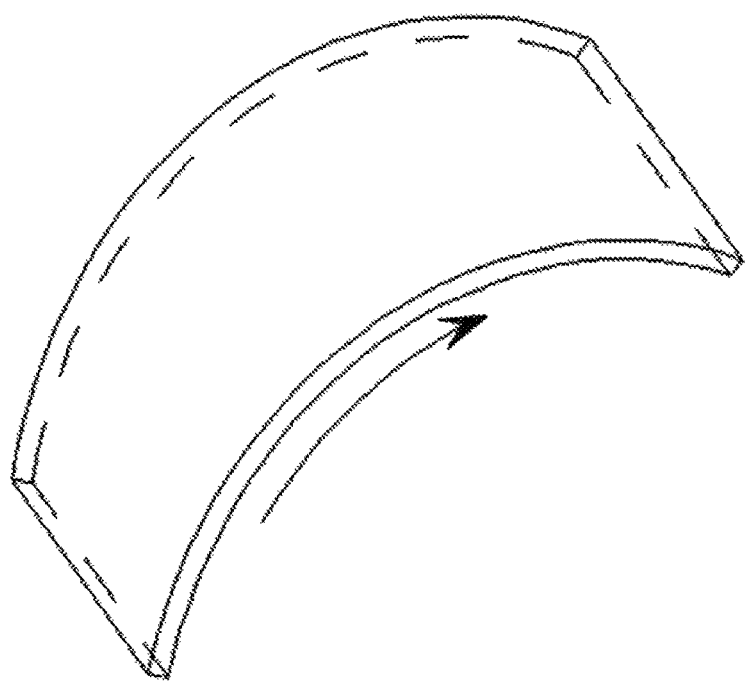
FIG. 25 is one schematic structural view of a blade.
Figure 26:
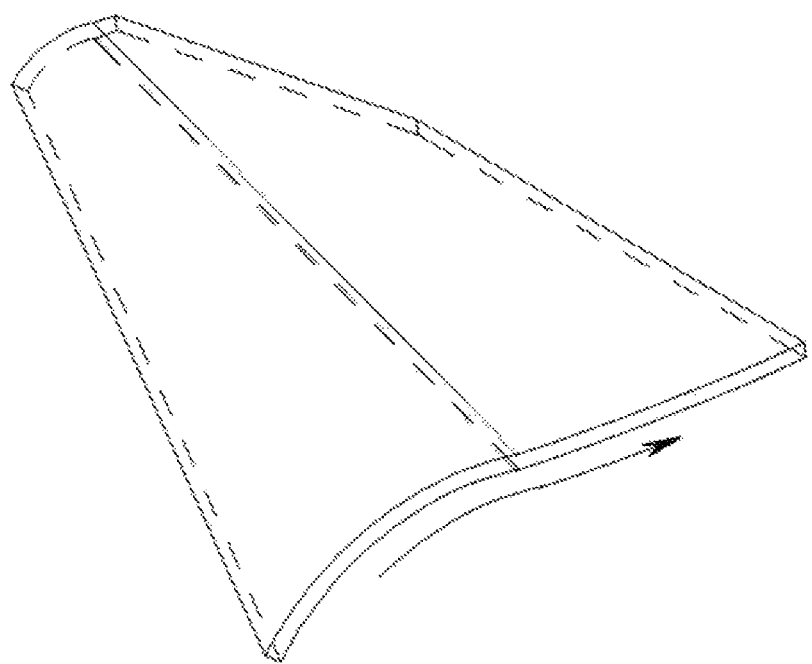
FIG. 26 is another schematic structural view of the blade.

A blade group for demisting and dedusting comprises a plurality of blades that are annularly arranged and a supporting member for fixing the blades; wherein the blade comprises a section of curved plate, a cross section of the curved plate being a gradually-varied arc curve whose curvature increases progressively along an airflow direction, as illustrated in FIG. 25 and FIG. 26.

Figure 1:
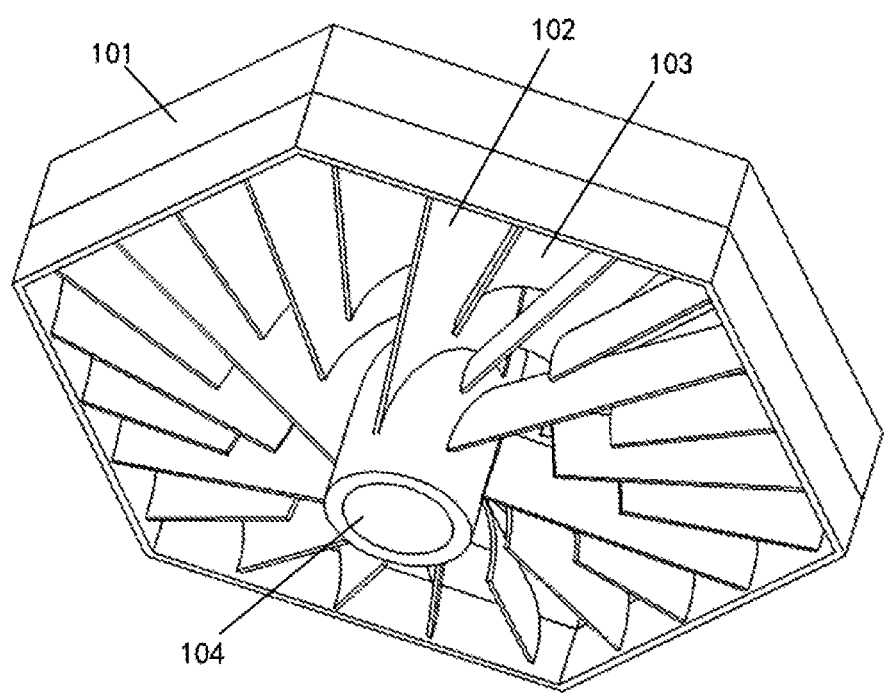
FIG. 1 is a schematic structural three-dimensional view of a blade group for demisting and dedusting in solution 1.
Figure 2:
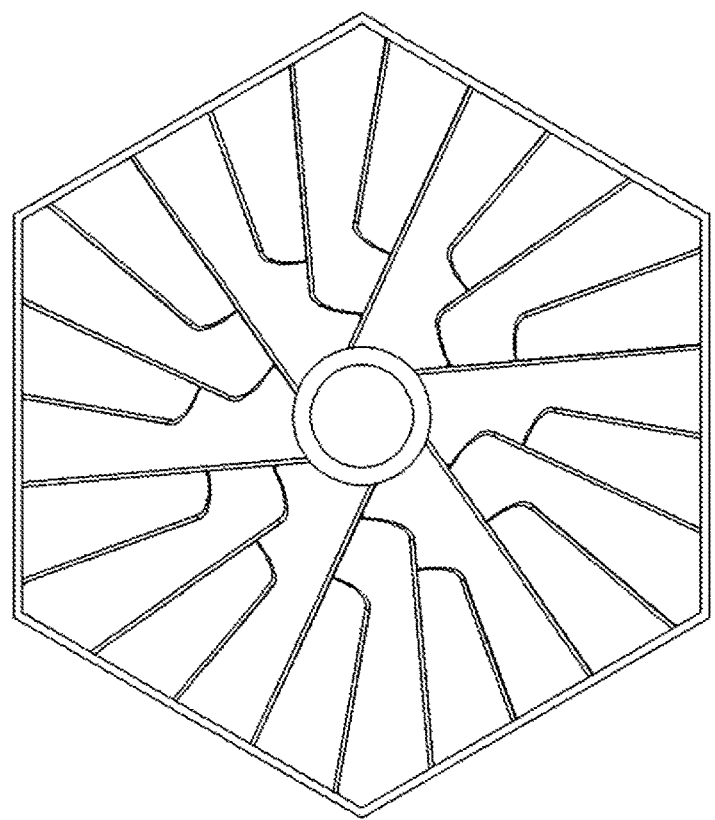
FIG. 2 is a schematic structural bottom view of the blade group for demisting and dedusting in solution 1.
Figure 3:
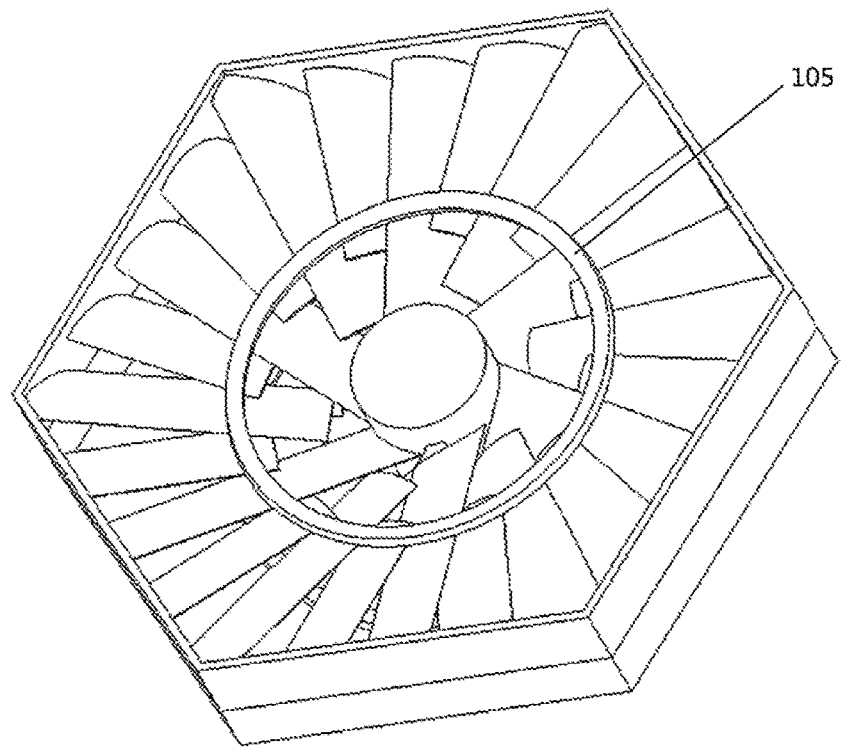
FIG. 3 is a schematic structural top view of the blade group for demisting and dedusting in solution 1.
Figure 4:
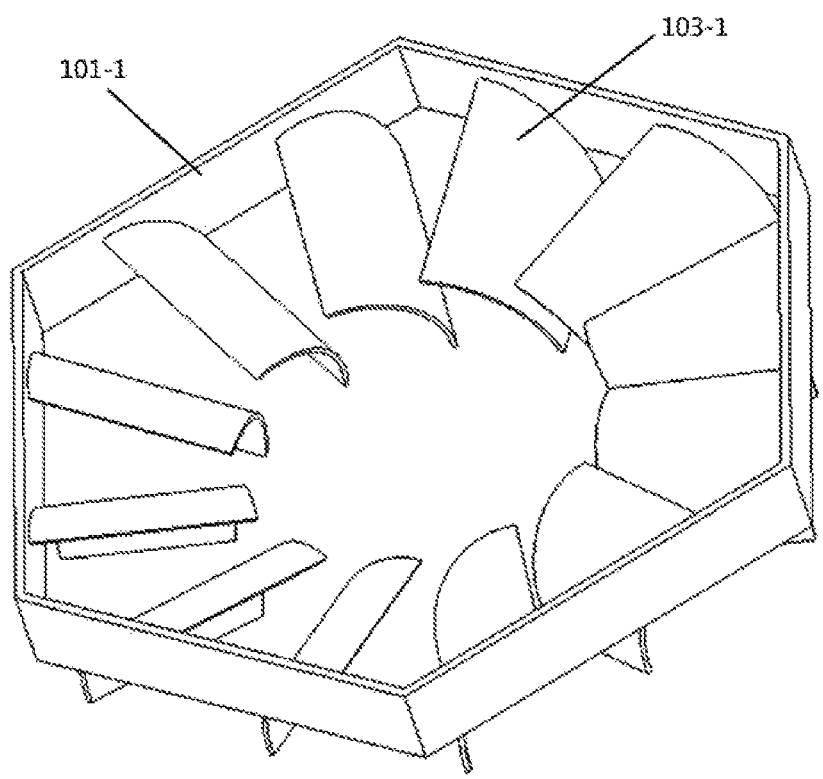
FIG. 4 is a schematic structural view of an assembly 1 according to the present invention.
Figure 5:
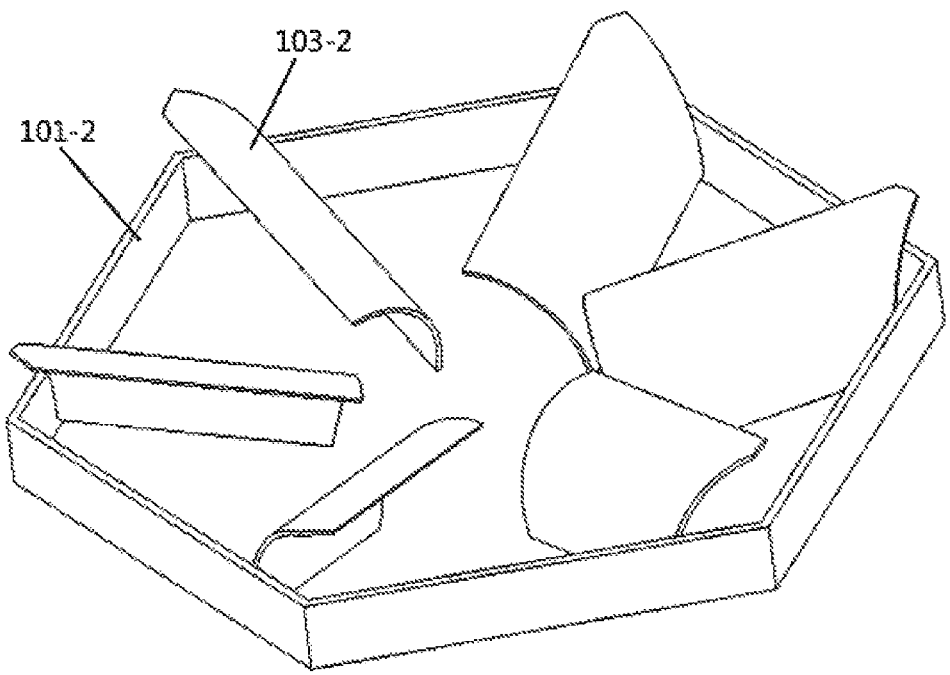
FIG. 5 is a schematic structural view of an assembly 2 according to the present invention.
Figure 6:
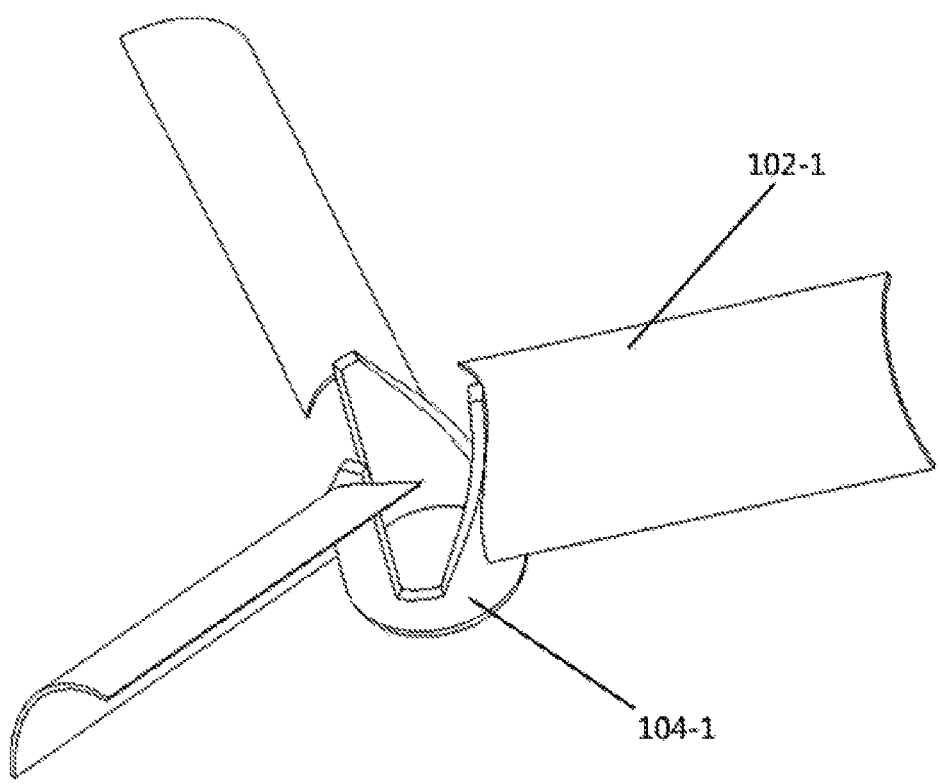
FIG. 6 is a schematic structural view of an assembly 3 according to the present invention.
Figure 7:
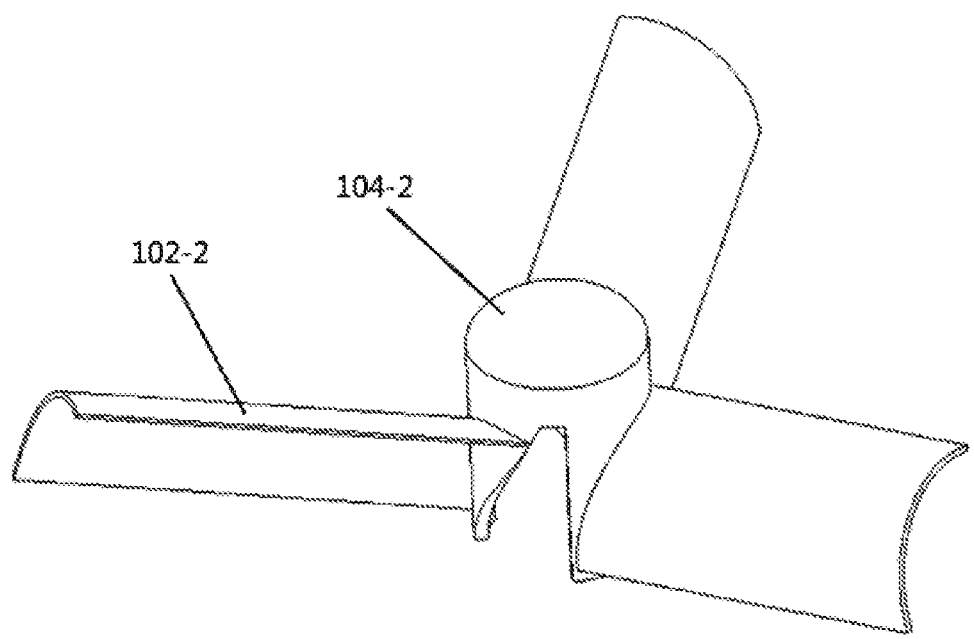
FIG. 7 is a schematic structural view of an assembly 4 according to the present invention.
Figure 8:
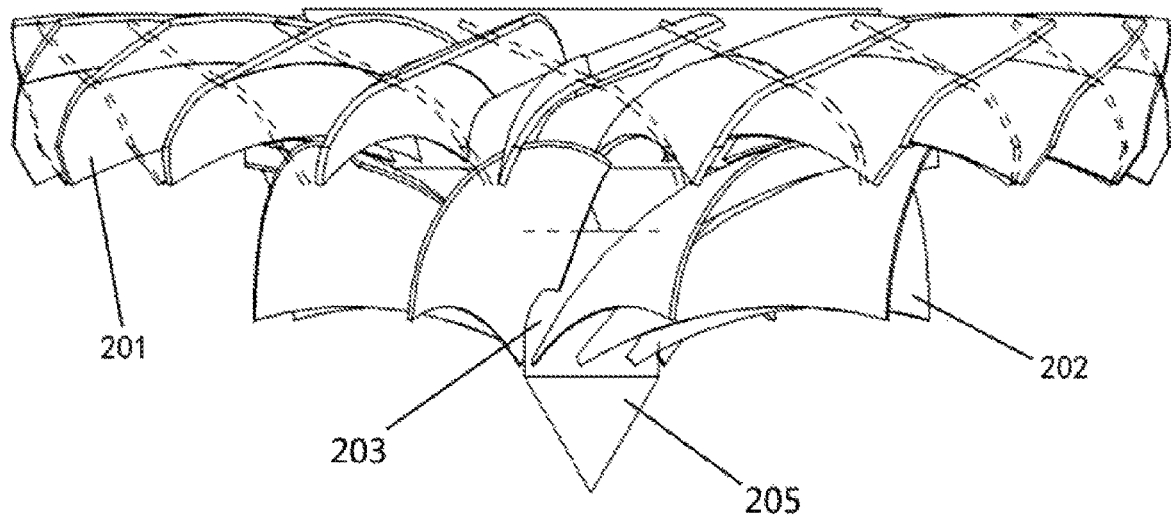
FIG. 8 is a schematic structural front view of a blade group for demisting and dedusting in solution 2.
Figure 9:
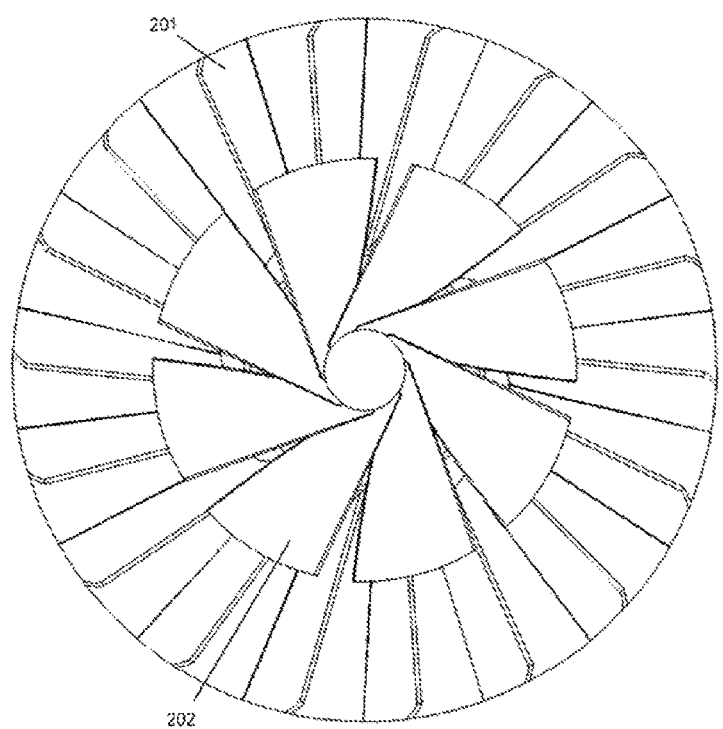
FIG. 9 is a schematic structural bottom view of FIG. 8.
Figure 10:
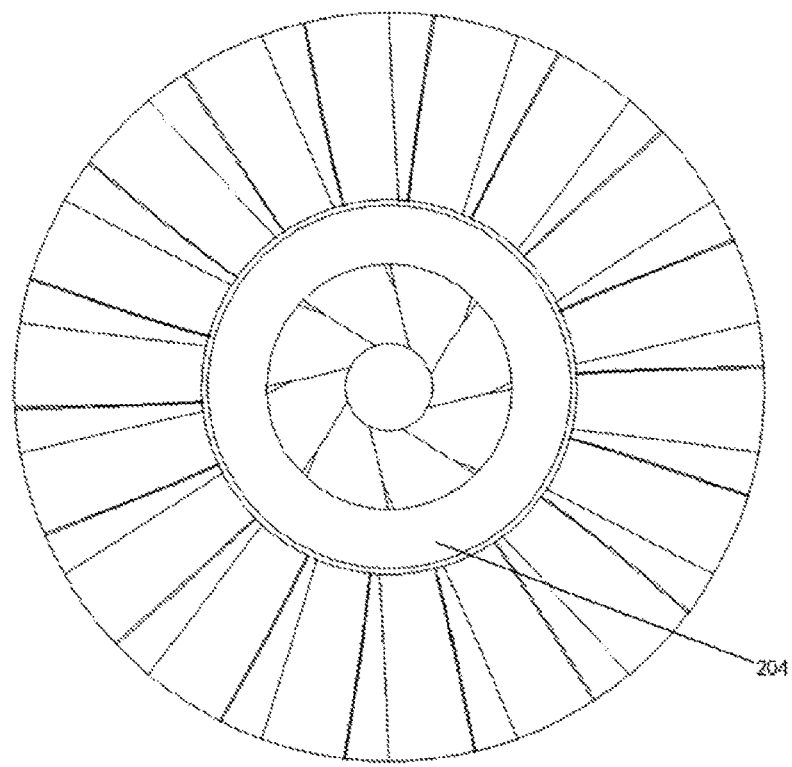
FIG. 10 is a schematic structural top view of FIG. 8.
Figure 11:
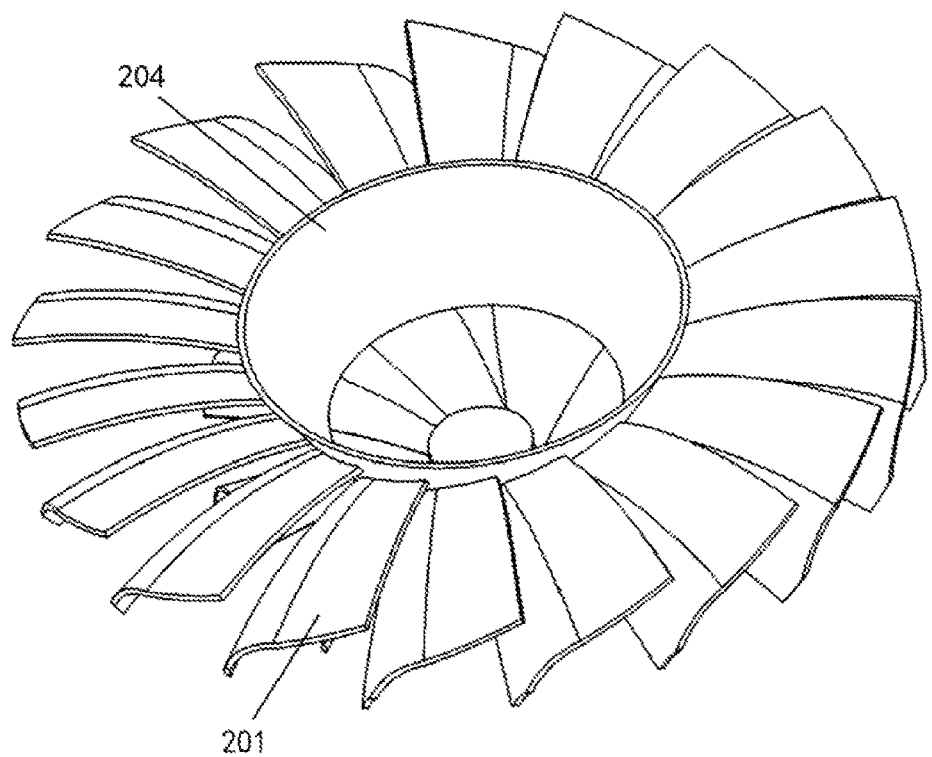
FIG. 11 is a schematic three-dimensional structural view of solution 2 according to the present invention.

Solution 1:

As illustrated in FIG. 1 and FIG. 2, the supporting member comprises an outer frame 101 and a central member 104, the blade group is provided with long blades 102 and short blades 103; wherein an outer end of the long blade 102 is connected to the outer frame 101 and an inner end of the long blade 102 is fixed to the central member 104; three short blades 102 having different lengths are arranged between adjacent long blades 102, an outer end of the short blade 103 is fixed to the outer frame 101, and an inner end of the short blade 103 faces towards the central member 104 and is not connected to the central member 104. To ensure the mounting strength of the blades, a positioning and reinforcement ring 105 may be further provided. As illustrated in FIG. 3, the middle part of each blade is foxed to the positioning and reinforcement ring 105.

When the coverage area between adjacent blades in the blade group is subject to an overlap, for the convenience of fabrication via the plastic injection process, the supporting member may be divided into a plurality of parts that may be spliced together. The blades having an overlap region are fixed to different parts of the supporting member and individually fabricated, and then the parts are assembled. As illustrated in FIG. 4 to FIG. 8, the blade group in this solution may be formed by splicing four assemblies. An assembly 1 is formed by an outer frame 101-1 and a first short blade 103-1 whose outer end is fixed to the outer frame 101-1, an assembly 2 is formed by an outer frame 101-2 and a second short blade 103-2 whose outer end is fixed to the outer frame 101-2, an assembly 3 is formed by a central member 104-1 and a partially long blade 102-1 whose inner end (root part) is fixed to the central member 104-1, and an assembly 4 is formed by a central member 104-2 and a remaining long blade 102-2 whose inner end (root part) is fixed to the central member 104-2. During splicing, the four assemblies are sequentially overlapped, and the blades are staggered and engaged properly, and then fixed.

Solution 2:

As illustrated in FIG. 8 to FIG. 11, the blade group comprises an upper blade layer and a lower blade layer are arranged; wherein an outer diameter of the upper blade layer is greater than that of the lower blade layer, blades 201 of the upper blade layer are fixed to a cylindrical central ring 204, blades 202 of the lower blade layer are fixed to a columnar central member 203, the central member 203 and the central ring 204 are coaxial, and an incident-flow face at the bottom of the central member 203 is provided with a flow guide cone 205.

Figure 18:
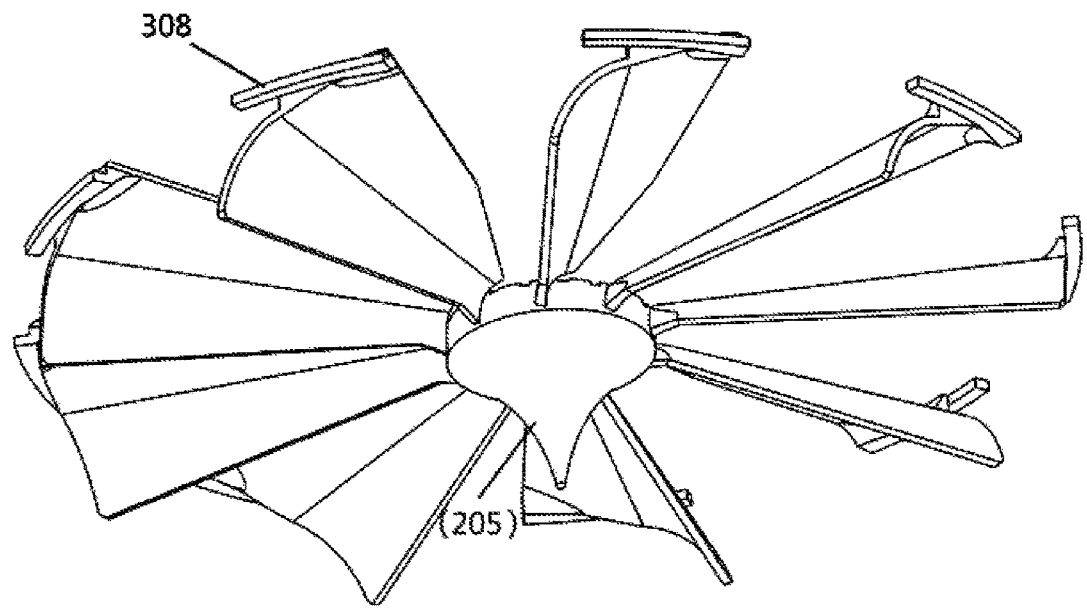
FIG. 18 is another schematic structural view of the assembly 2 in solution 3 according to Embodiment 2 of the present invention.
Figure 19:
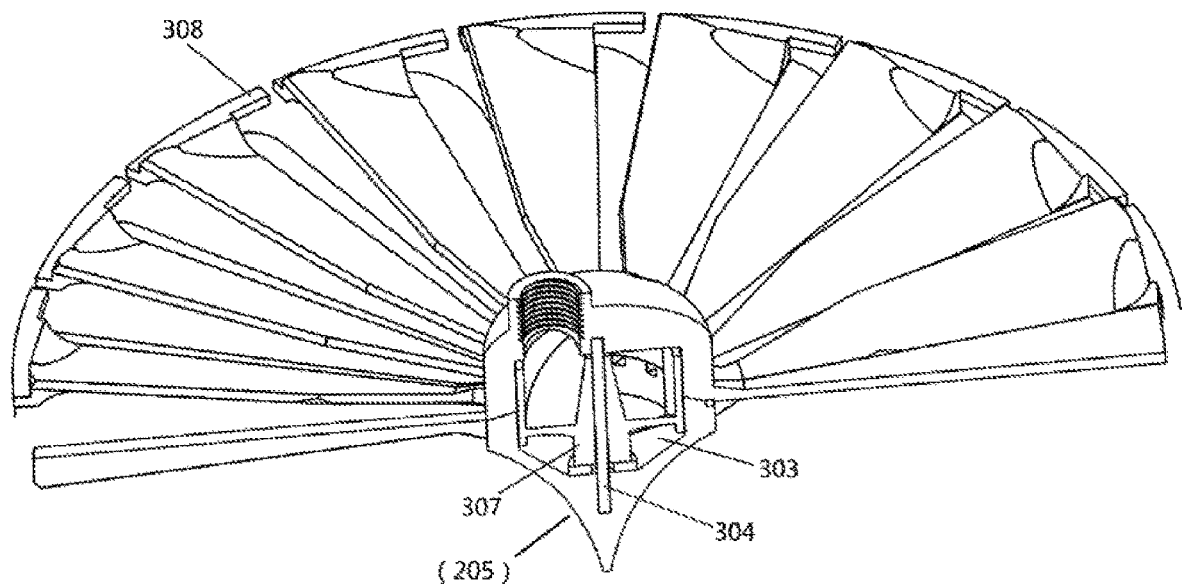
FIG. 19 is a schematic structural sectional view of solution 3 according to Embodiment 2 of the present invention.

The flow guide cone 205 may be a straight cone or an arc cone. If an arc cone is employed, the generant thereof may be an arc curve whose curvature increases along the direction of the gas flow (from bottom to top), and reference may be made to FIG. 18 and FIG. 19 in solution 3.

Relative to the straight plate, the curved plate is subject to a great gas resistance. Therefore, when the blades 202 of the lower blade layer are curved plates, the blades 201 of the upper blade layer employ a combination of the curved plates and straight plates, and the blades extend at a gradually-bending end of the curved plate to form a section of straight plate to properly reduce the resistance. The straight plate is connected to the curved plate by virtue of smooth transition, as illustrated in FIG. 26.

Solution 3:

Embodiment 1

Figure 12:
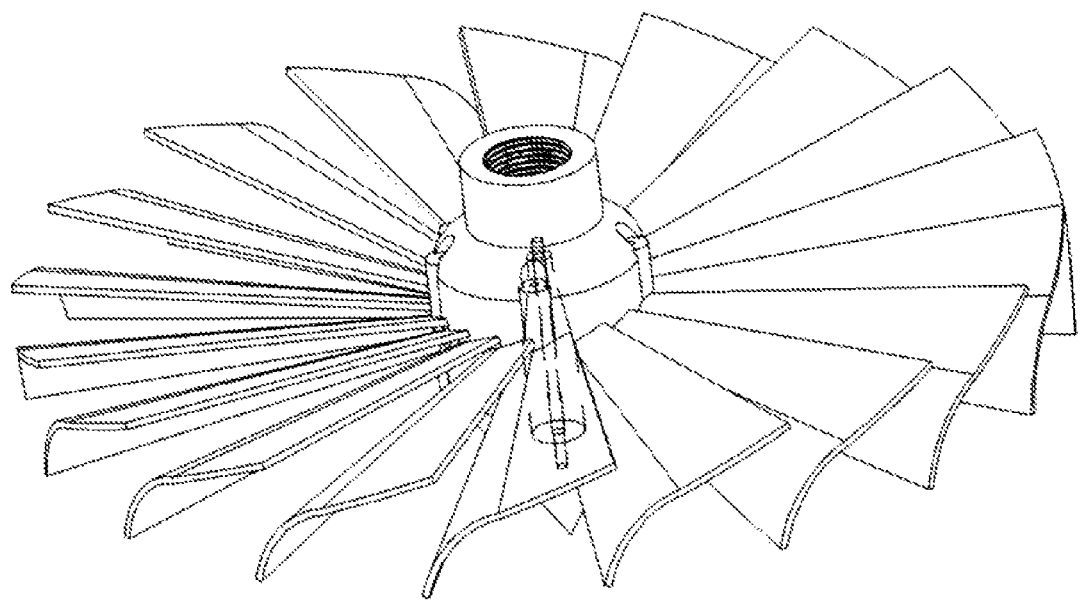
FIG. 12 is a schematic structural three-dimensional view of a blade group for demisting and dedusting in solution 3 according to Embodiment 1 of the present invention.
Figure 13:
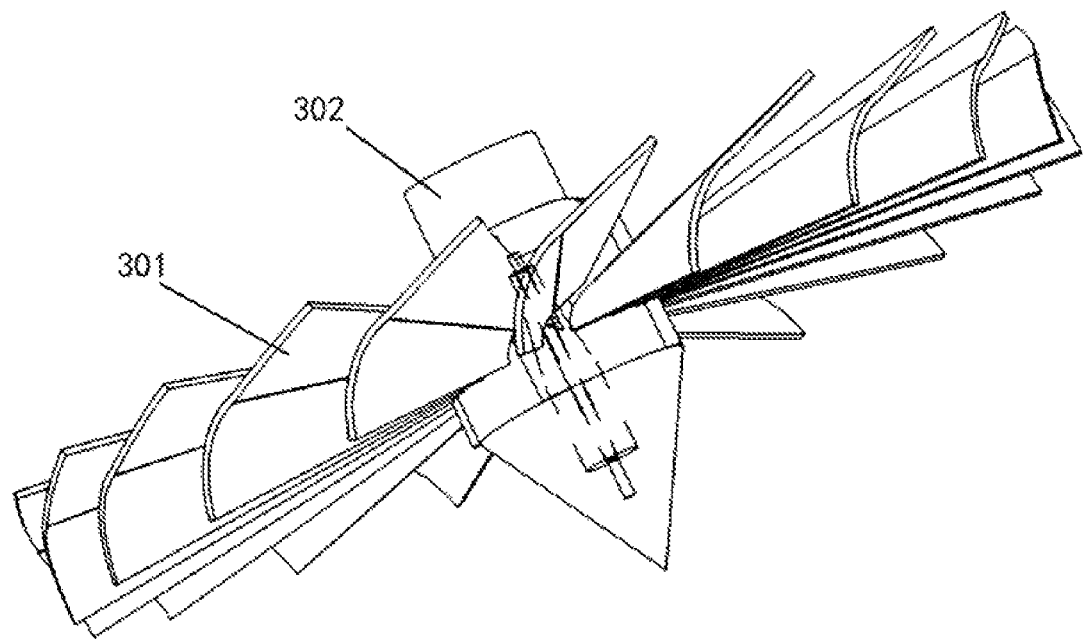
FIG. 13 is another schematic structural three-dimensional view of the blade group for demisting and dedusting in solution 3 according to Embodiment 1 of the present invention.
Figure 14:
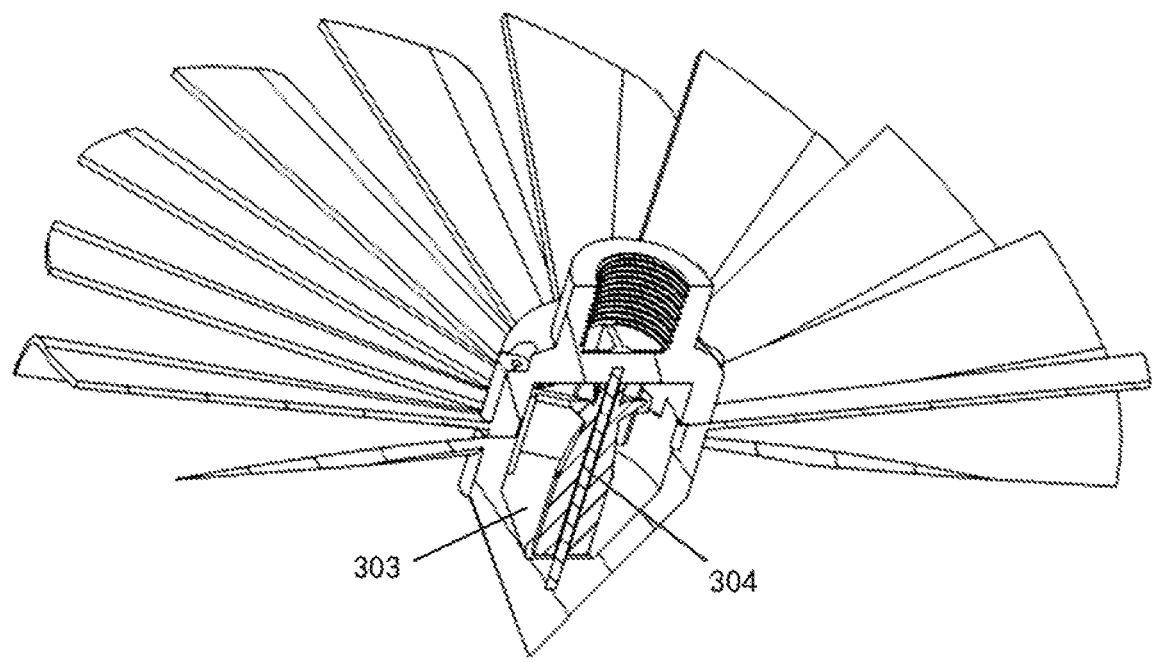
FIG. 14 is a schematic structural sectional view of solution 3 according to Embodiment 1 of the present invention.
Figure 17:
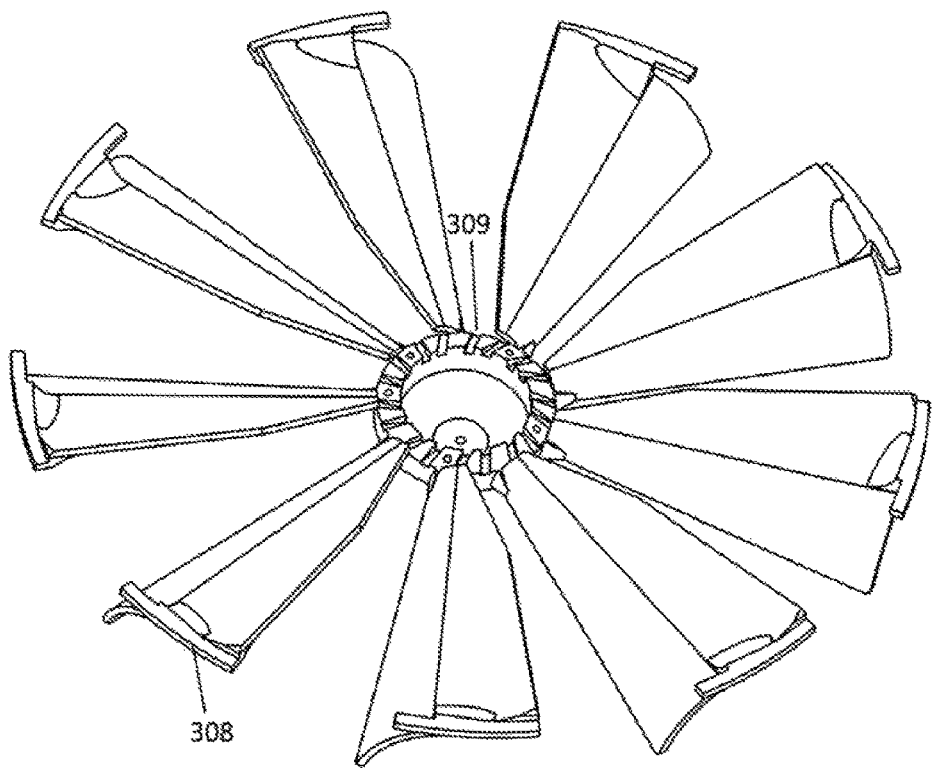
FIG. 17 is a schematic structural view of the assembly 2 in solution 3 according to Embodiment 2 of the present invention.

As illustrated in FIG. 12 to FIG. 14, the supporting member comprises a central member 302. Blades 301 are fixed to the central member 302. The central member 302 is internally provided with a washing water distribution chamber 303, and a water injection port in communication with the washing water distribution chamber is arranged at the upper part of the central member 302. The water injection port is provided with a threaded tube in connection with a water intake tube. A washing water distribution wheel is arranged in the washing water distribution chamber 303. The central member 302 is provided with a washing hole 309 on a side wall of the washing water distribution chamber 303 circumferentially corresponding to each blade. Reference may be made to FIG. 17 of Embodiment 2.

Figure 20:
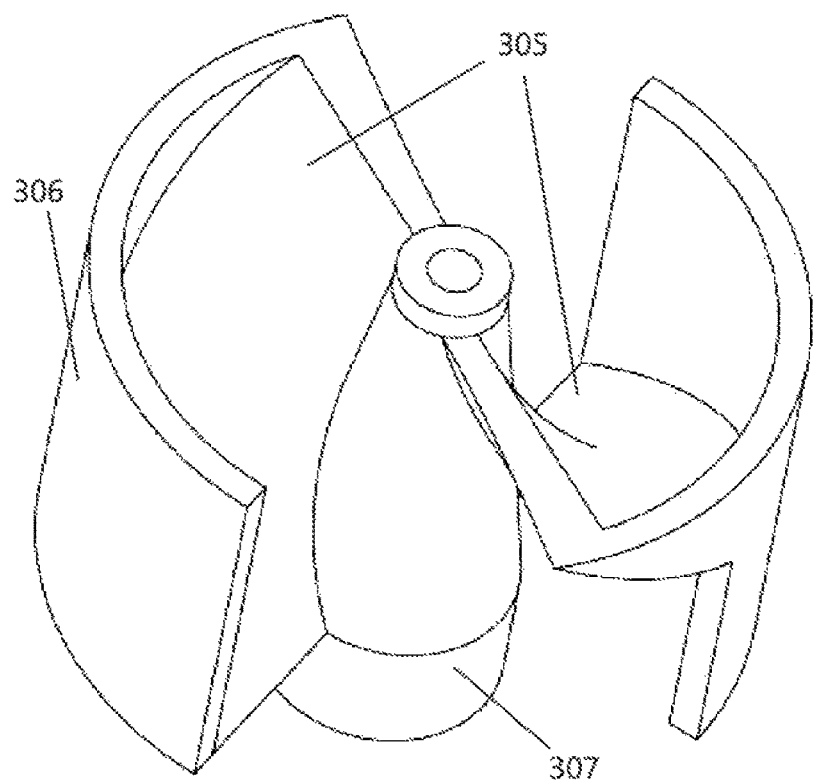
FIG. 20 is a schematic structural view of a washing water distribution wheel according to Embodiment 1 of the present invention.
Figure 21:
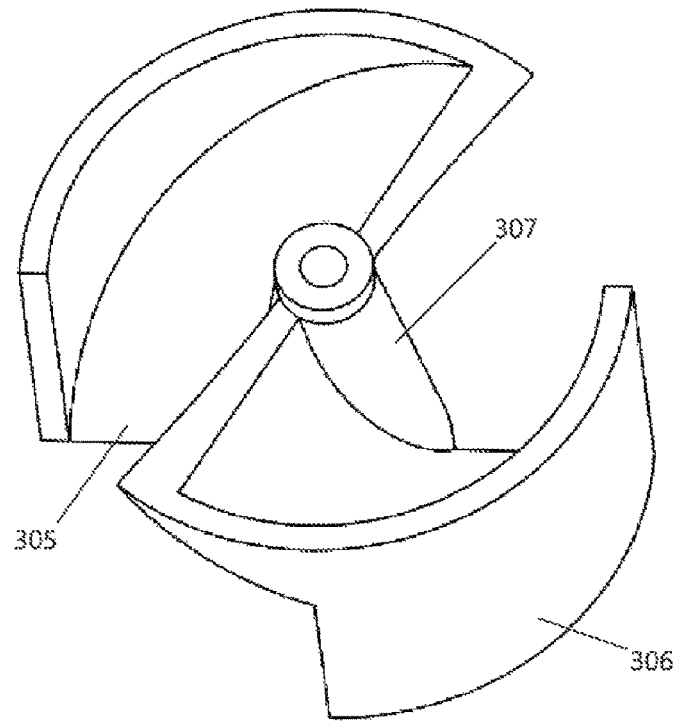
FIG. 21 is another schematic structural view of the washing water distribution wheel according to Embodiment 1 of the present invention.
Figure 22:
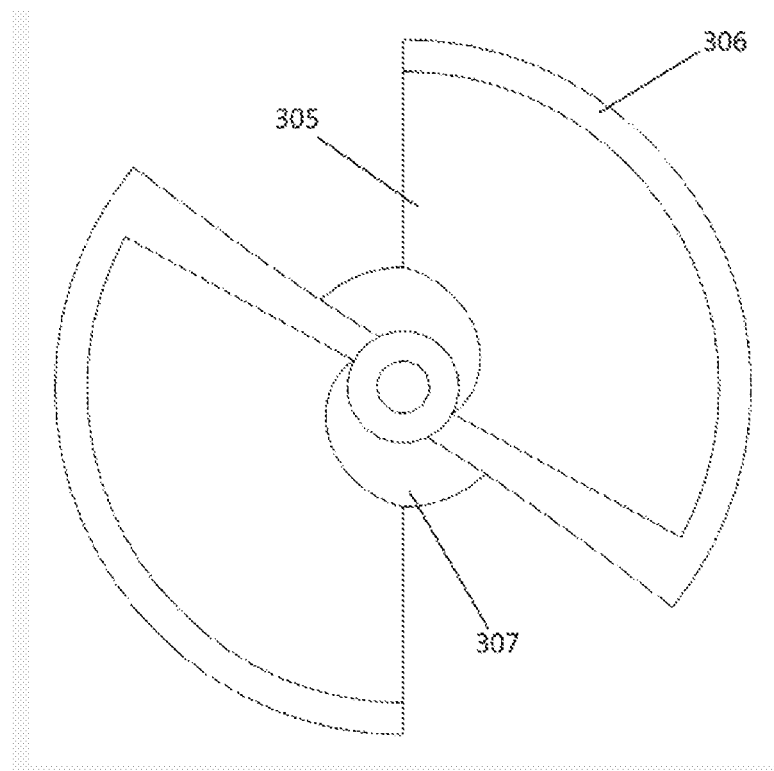
FIG. 22 is still another schematic structural view of the washing water distribution wheel according to Embodiment 1 of the present invention.
Figure 23:
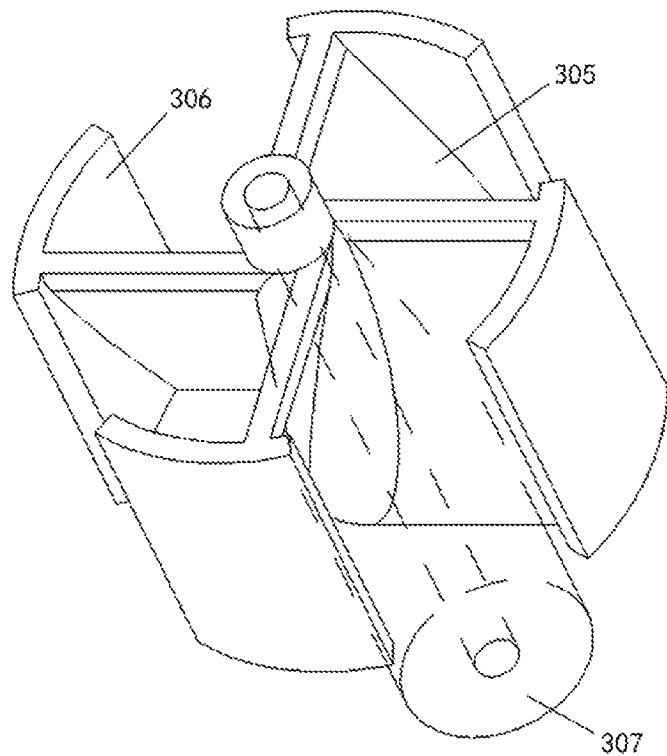
FIG. 23 is a schematic structural view of a washing water distribution wheel according to Embodiment 2 of the present invention.

As illustrated in FIG. 20 to FIG. 22, the washing water distribution wheel comprises a central seat 307 and a plurality of arc baffles 306 vertically arranged on a periphery of the central seat 307. The arc baffle 306 is configured to shield the washing hole, a water discharge gap is maintained between adjacent arc baffles 306, the central seat 307 is connected to the arc baffle 306 via an inclined ramp 305 facing towards the water injection port, the inclined ramp 305 spirals down, an outer edge of the inclined ramp 305 is connected to an inner side face of the arc baffle 306, an inner edge of the included ramp 305 is connected to the central seat 307, and the inclined ramps 305 connecting the arc baffles to the central seat are all clockwise inclined or all counterclockwise inclined. A central shaft rod 304 is arranged in the washing water distribution chamber of the central member 302, and the central seat 307 of the washing water distribution wheel is mounted on the central shaft rod 304 and rotates around the shaft rod under effect of a water force. FIG. 23 illustrates another embodiment of the washing water distribution wheel.

During the use, when the water flow with a specific pressure enters from the water injection port into the washing water distribution chamber 303 of the central seat and shocks the inclined ramp 305 of the washing water distribution wheel, under the effects of the water floating force and shocking force, the washing water distribution wheel rotates, and the arranged arc baffle 306 increases the water discharge pressure of the washing hole, such that the washing holes are intermittently shielded or exposed. In this way, a better washing effect is achieved, and water is saved. According to the practice, when the arc baffle 306 shields a half of the washing holes, about 50% of washing water may be saved; and when the arc baffle 306 shields ⅔ of the washing holes, about 65% of washing water mat be saved.

The blade 301 employs a combination of a curved plate and a straight plate, extends at a gradually-bending end of the curved plate to form a section of straight plate, wherein the straight plate is connected to the curved plate by virtue of smooth transition.

Embodiment 2

Figure 15:
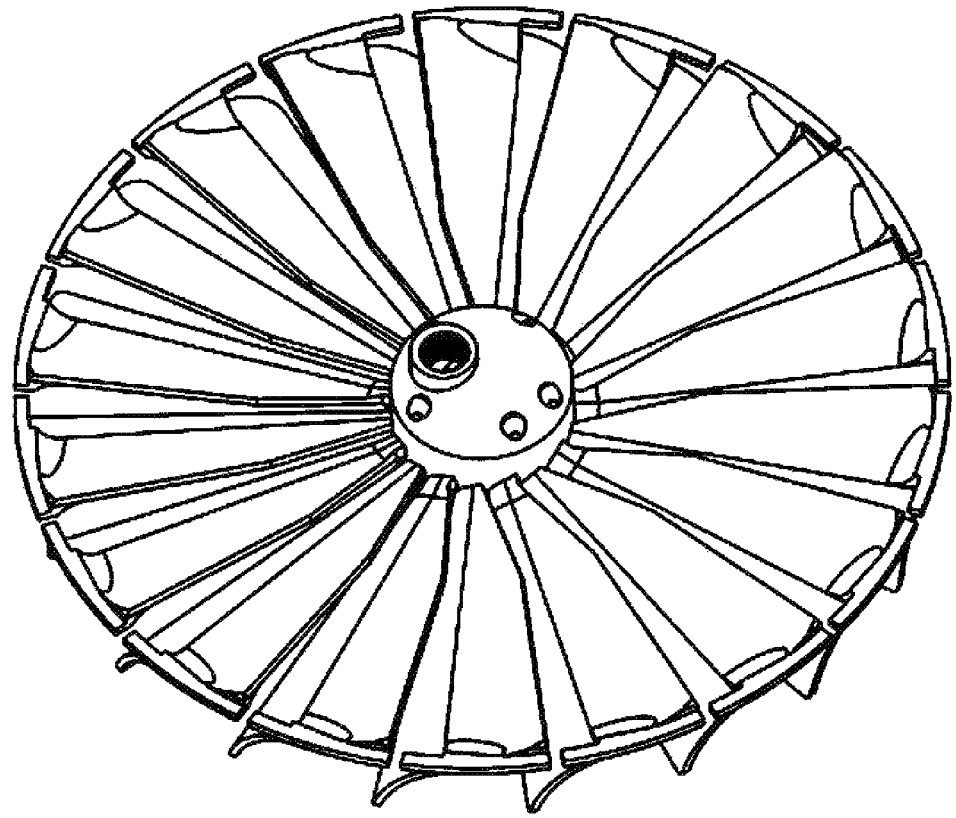
FIG. 15 is a schematic structural three-dimensional view of the blade group for demisting and dedusting in solution 3 according to Embodiment 2 of the present invention.
Figure 16:
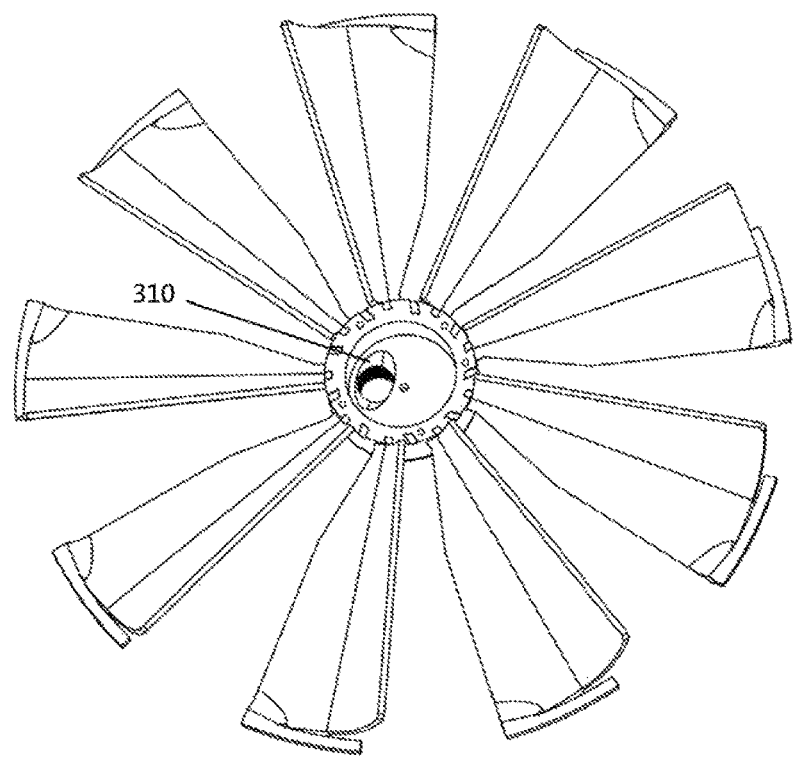
FIG. 16 is a schematic structural view of the assembly 1 in solution 3 according to Embodiment 2 of the present invention.

Based on Embodiment 1, the water injection port may be eccentrically arranged on the central member 302, such that the injected water concentrates and shocks the inclined ramp 305 of the washing water distribution wheel, as illustrated in FIG. 15. In addition, to ensure that the injected water has a sufficient contact area with the inclined ramp 305 of the washing water distribution wheel, and a flare 310 may be additionally arranged at the water discharge end of the water injection port. The flare 310 is made to expand towards the direction of the inclined ramp 305, and thus a horn-shaped flare having an elliptical cross section is formed. The short axis direction of the ellipse is radially consistent with the washing water distribution wheel, and is not expanded towards the center of the washing water distribution wheel, as illustrated in FIG. 16. The incident-flow face at the bottom of the central member 302 is provided with a flow guide cone, wherein the flow guide cone may also be an arc cone whose curvature gradually increases.

For ease of mounting of the blade group, the outer edge of each blade is provided with a transversal arc-shaped mounting bar 308. By holding the mounting bar 308, the blade group may be fixed to the external device and mounted on the external device. In the meantime, the connection may be reinforced by means of welding.

In this solution, the blade group for demisting and dedusting may be formed via interconnection of an upper portion and a lower portion. The central member 302 is divided at the washing water distribution chamber into two an upper part and a lower part; wherein a ring of blades are fixed to the upper part of the central member 302, a ring of blades are also fixed to the lower part of the central member and are staggered with the blades at the upper part of the central member, such that the two rings of blades are spliced into one layer after the upper part and the lower part of the central member 302 are engaged.

Figure 24:
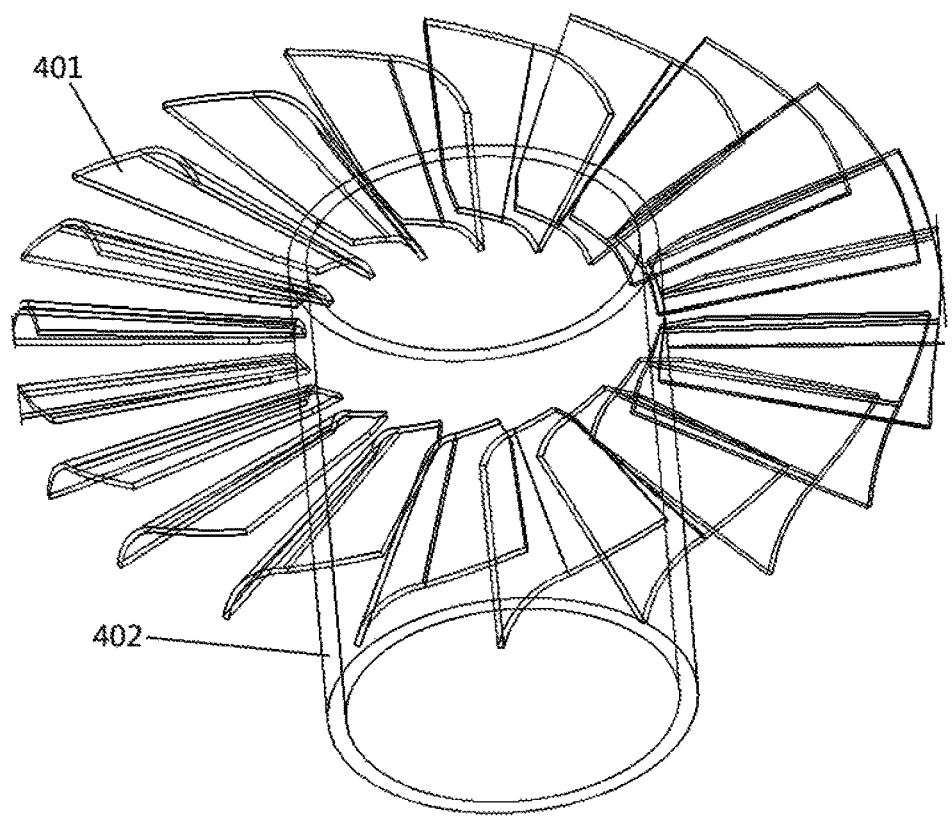
FIG. 24 is a schematic structural view of solution 4.

Solution 4:

As illustrated in FIG. 24, the supporting member comprises a cylindrical central ring 402 passing through in a vertical direction, the blades 401 surround the central ring 402 and are fixed to the central ring 402, and the central ring 402 extends by a section at the side (a lower part of the blade) of incident-flow of the blade group relative to the position of a gas inlet port of the blades.

In the demising device, one or a plurality of blade groups in this solution may be arranged at the rear portion of the blade group in other solutions.

In the above solutions, the blades are densely distributed in the central region. To avoid an over-great resistance of the blade group in the central region, the blades may be designed to be wide inside and narrow outside, or the roots of the blades close to the center are partially cut off.

The arc curves of the cross section of the curved plate of the blade and the generant of the flow guide cone may be selected from any one of a drag line, a spiral (a logarithmic spiral, a gold spiral and a hyperbolic spiral), an involute, an evolute, a exterior trochoid (a cardiac line), a trailing line, a cissoid, a catenary, a rosa line, an epicycloid, a limacon and the like, and used after correction. A preferred solution is a corrected involute, and the curve equation is as follows:

$$\begin{cases} x = k*r*x(\cos\varphi + \varphi*\sin\varphi) \\ y = r*(\sin\varphi - \varphi*\cos\varphi) \\ \varphi = 0 - \pi/2; r = 0.5 - 10 \text{ mm}, k = 0.3 - 3 \end{cases}$$

wherein φ is a spread angle, r is a base circle radius, and k is a correction coefficient.

The basic principle, main features and advantages of the present invention are described and illustrated above. A person skilled in the art would understand that the present invention is not limited to the above embodiments. The above embodiments and description in the specification are only intended to elaborate the principle of the present invention. Various variations and improvements may also be made to the present invention without departing from the spirit and scope of the present invention. The protection scope of the present invention is defined by the appended claims, specification and equivalents thereof.

What is claimed is:

1. A blade croup for demisting and dedusting, comprising a plurality of blades that are annularly arranged and a supporting member for fixing the blades; wherein the blade comprises a section of curved plate, a cross section of the curved plate being a gradually-varied arc curve whose curvature increases progressively along an airflow direction;

wherein the arc curve is a corrected involute and the curve equation is:

$$\begin{cases} x = k*r*(\cos\varphi + \varphi*\sin\varphi) \\ y = r*(\sin\varphi - \varphi*\cos\varphi) \\ k = 0.3 - 3 \end{cases}$$

wherein φ is a spread angle, r is a base circle radius, and k is a correction coefficient;

wherein the supporting member comprises a central member, the blades are fixed to the central member, the central member is internally provided with a washing water distribution chamber, the central member is provided with a water injection port in communication with the washing water distribution chamber, a washing hole is arranged, corresponding to each blade, on a side wall of the washing water distribution chamber, and a washing water distribution wheel is mounted in the washing water distribution chamber;

the washing water distribution wheel comprises a central seat and a plurality of arc baffles vertically arranged on a periphery of the central seat, wherein the arc baffle is configured to shield the washing hole, a water discharge gap is maintained between adjacent arc baffles, the central seat is connected to the arc baffle via an inclined ramp, an outer edge of the inclined ramp is connected to an inner side face of the arc baffle, an inner edge of the included ramp is connected to the central seat, and the inclined ramps connecting the arc baffles to the central seat are all clockwise inclined or all counterclockwise inclined;

a central shaft rod is arranged in the washing water distribution chamber of the central member, and the central seat of the washing water distribution wheel is mounted on the central shaft rod and rotates around the shaft rod under effect of a water force; and an incident-flow face at the bottom of the central member is provided with a flow guide cone.

2. The blade group for demisting and dedusting according to claim 1, wherein the blades extend at a gradually-bending end of the curved plate to form a section of straight plate, wherein the straight plate is connected to the curved plate by virtue of smooth transition.

3. The blade group for demisting and dedusting according to claim 1, wherein the blade group is formed by an upper portion and a lower portion that are interconnected, the central member is divided at the washing water distribution chamber into an upper part and a lower part; wherein a ring of blades are fixed to the upper part of the central member, a ring of blades are also fixed to the lower part of the central member and are staggered with the blades at the upper part of the central member, such that the two rings of blades are spliced into one layer after the upper part and the lower part of the central member are engaged.

* * * * *